US007200813B2

(12) United States Patent
Funaki

(10) Patent No.: US 7,200,813 B2

(45) Date of Patent: Apr. 3, 2007

(54) PERFORMANCE INFORMATION EDIT AND PLAYBACK APPARATUS

(75) Inventor: Tomoyuki Funaki, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 497 days.

(21) Appl. No.: 09/833,863

(22) Filed: Apr. 12, 2001

(65) Prior Publication Data

US 2001/0030659 A1 Oct. 18, 2001

(30) Foreign Application Priority Data

Apr. 17, 2000 (JP) ............................ 2000-115010

(51) Int. Cl.
*H04N 5/44* (2006.01)
*G10H 7/00* (2006.01)

(52) U.S. Cl. ..................... 715/716; 715/723; 715/727; 84/622; 84/637; 84/645

(58) Field of Classification Search ................ 345/716, 345/723; 84/645, 622, 637
See application file for complete search history.

(56) References Cited

U.S. PATENT DOCUMENTS

| | | | | | |
|---|---|---|---|---|---|
| 5,326,930 | A | * | 7/1994 | Hayakawa | 84/636 |
| 5,495,072 | A | * | 2/1996 | Kumagi | 84/601 |
| 5,627,335 | A | * | 5/1997 | Rigopulos et al. | 84/635 |
| 5,663,517 | A | * | 9/1997 | Oppenheim | 84/649 |
| 5,723,803 | A | | 3/1998 | Kurakake | |
| 5,739,454 | A | * | 4/1998 | Kunimoto | 84/615 |
| 5,754,851 | A | * | 5/1998 | Wissner | 707/104.1 |
| 5,801,694 | A | * | 9/1998 | Gershen | 715/727 |
| 5,864,079 | A | * | 1/1999 | Matsuda | 84/619 |
| 5,908,997 | A | * | 6/1999 | Arnold et al. | 84/615 |
| 6,051,770 | A | * | 4/2000 | Milburn et al. | 84/611 |
| 6,353,170 | B1 | * | 3/2002 | Eyzaguirre et al. | 84/603 |
| 6,362,411 | B1 | * | 3/2002 | Suzuki et al. | 84/626 |
| 6,424,944 | B1 | * | 7/2002 | Hikawa | 704/260 |
| 2004/0094017 | A1 | * | 5/2004 | Suzuki et al. | 84/609 |

FOREIGN PATENT DOCUMENTS

| | | |
|---|---|---|
| JP | H07-244478 | 9/1995 |
| JP | 10/133658 | 5/1998 |
| JP | H07-121179 | 5/1999 |
| JP | 11-126068 | 11/1999 |

OTHER PUBLICATIONS

Acid Music editing program, owned by Sonic Foundry.* http://www.harmony-central.com/Events/WNAMM98Sonic_Foundry/ACID.html.*

* cited by examiner

*Primary Examiner*—Weilun Lo
*Assistant Examiner*—Sara M Hanne
(74) *Attorney, Agent, or Firm*—Harness, Dickey & Pierce, PLC

(57) ABSTRACT

The computer-implemented system stores user performance data representing multiple parts. The system also stores style data representing various different musical accompaniments that are displayed in a style data window. The user selectively copies constituent parts of the style data into a user performance data window, thereby incorporating the copied parts into the performance data. Tone pitches and musical length of the copied parts are automatically modified to suit the chord information and timing represented in the existing performance data. As the user records performance data, the on-screen start switch is displays differently (e.g., different color) to show whether the specific part corresponds to a recording part or a non-recording part.

4 Claims, 7 Drawing Sheets

PERFORMANCE INFORMATION EDIT AND PLAYBACK APPARATUS

BACKGROUND OF THE INVENTION

1. Field of the Invention

This invention relates to performance information edit and playback apparatuses that edit performance information to play back automatic performance and automatic accompaniment by computer music systems such as electronic musical instruments.

2. Description of the Related Art

Conventionally, engineers design and propose computer music systems such as electronic musical instruments that reproduce performance information, which is called style data containing tone pitch data and timing data, to play back automatic accompaniment. The style data contain multiple parts for percussion instruments, accompaniment, etc. In addition, users of the electronic musical instruments can create or edit user's performance data containing multiple parts, by which musical performance is to be played back.

As for edit and playback of the performance information, the conventional apparatuses provide various functions, which are described below.

That is, user's performance data are created using style data containing multiple parts. Herein, a copy function is provided to copy the style data as the user's performance data on a storage, wherein the style data represent styles each having one or more parts. Conventionally, the style data are written to a storage area of the user's performance data by units of styles respectively. Namely, all parts of the style are collectively written to the storage area.

In a playback mode, there is provided a function that enables simultaneous reproduction of the user's performance data and style data.

In a record mode, there is provided a function in which the user designates a certain part of the user's performance data by operating a record switch and a start switch so that performance data are to be recorded on the storage or media with respect to the designated part.

However, the conventional apparatuses bear various problems with regard to the aforementioned functions. As for the copy function in which the style data are copied (or written) into the user's performance data, for example, all parts of the style are collectively written to the storage area of the user's performance data. This raises an inconvenience in which the user is unable to create 'frequently-used' performance data by copying a selected part (or selected parts) of the style.

In addition, the conventional apparatuses are restricted in functions such that the user's performance data and style data are simultaneously reproduced. This raises a problem in which the user is unable to always play back musical performance in a desired manner. In some cases, both of the style data and user's performance data contain parts that are assigned to a same tone-generation channel of a sound source in a duplicate manner. In those cases, the apparatus plays back a musical tune containing merging of the parts which are subjected to duplicate assignment to the same tone-generation channel of the sound source in the duplicate manner. Therefore, the user may feel inconvenience due to unintentional merging of parts that occur in the musical tune being played back.

In the case of the record mode that enables recording upon user's operations regarding the record switch and start switch, the conventional apparatus does not provide distinction in display between a recording part, which is set to a record mode, and a non-recording part which is not set to the record mode. The conventional apparatus does not provide a distinction between the aforementioned parts in display, so that the user is unable to visually grasping whether the recording is actually performed on the performance data or not. This raises an inconvenience for the user due to inadequate display as representation of the recording status.

SUMMARY OF THE INVENTION

It is an object of the invention to provide a performance information edit and playback apparatus that are improved in functions to provide conveniences for the user who edits, records and plays back performance information containing user's performance data and style data.

A performance information edit and playback apparatus is actualized by loading programs into a computer having a display and a storage that stores user's performance data containing multiple parts and plenty of style data each of which contains multiple constituent parts. On the screen of the display, there are provided a performance data window showing contents of the multiple parts of the user's performance data and a style data window showing content of desired style data that is selected by the user. Thus, the user is able to copy a constituent part of the desired style data in the style data window to a specific part within the multiple parts of the user's performance data in the performance data window. Herein, tone pitches of the copied constituent part of the desired style data are automatically modified to suit to chord information that is previously allocated to a chord sequence in the performance data window. In addition, a length of the copied constituent part of the desired style data is automatically adjusted to match with the specific part of the user's performance data by units of measures. The recording on the specific part of the user's performance data is started upon user's operations of a record switch and a start switch on the screen of the display.

In addition, the user is able to alternatively select one of the specific part of the user's performance data and the constituent part of the desired style data, both of which are allocated to a same tone-generation channel. Thus, it is possible to avoid occurrence of merging between the aforementioned parts in playback of a musical tune.

Further, the apparatus performs discrimination as to whether the specific part corresponds to a recording part, which is set to a record mode, or a non-recording part which is not set to the record mode. In response to the discrimination result, the start switch is changed in a display manner (e.g., color) on the screen.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 9:
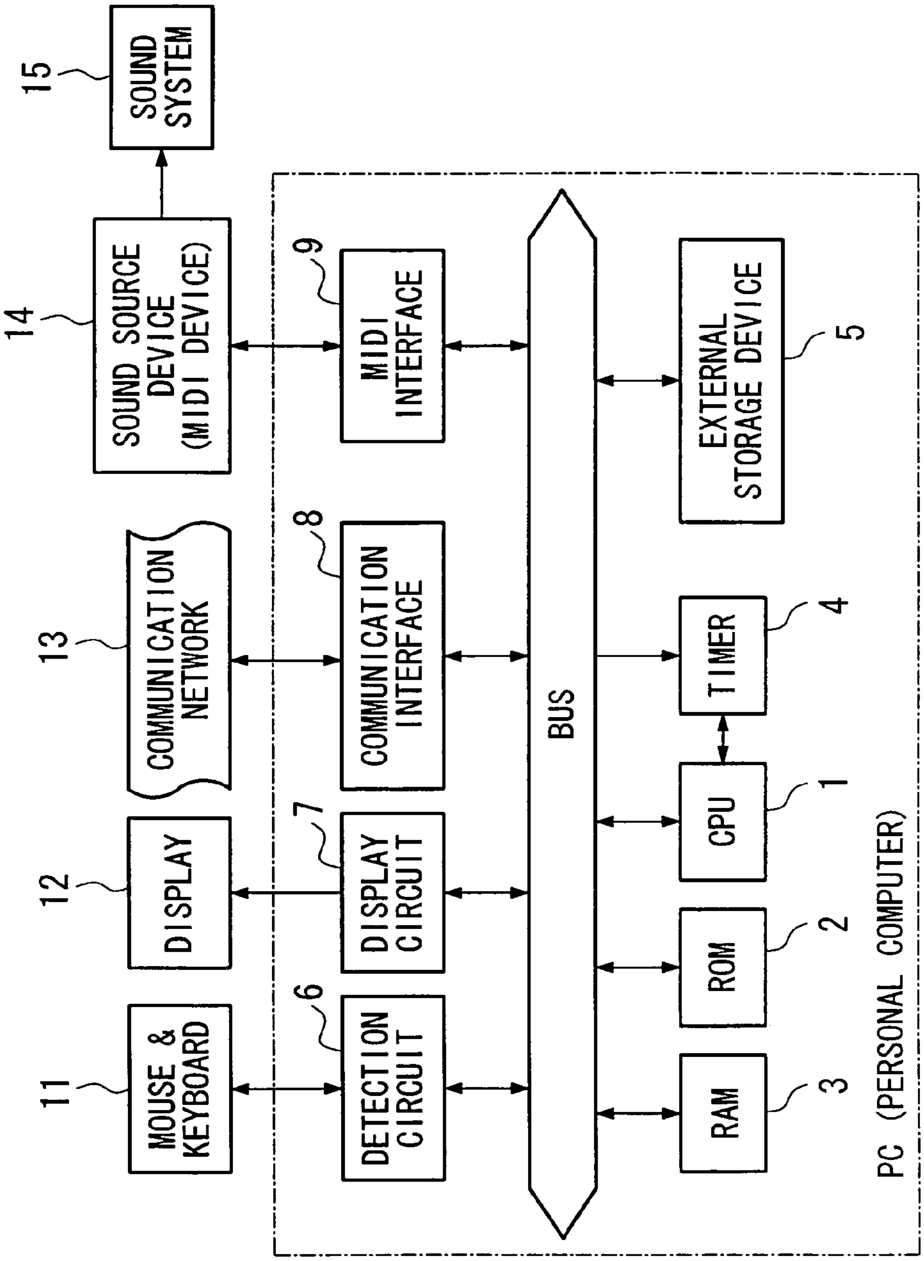
FIG. 9 is a block diagram showing configurations of a personal computer and its peripheral devices that execute software programs to actualize functions of a performance information edit and playback system in accordance with the embodiment of the invention.

FIG. 9 shows an overall configuration of a personal computer (PC) and its peripheral devices, which run software programs to actualize functions of a performance information edit and playback system in accordance with an embodiment of the invention. A main body of the personal computer is configured by a central processing unit (CPU) 1, a read-only memory (ROM) 2, a random-access memory (RAM) 3, a timer 4, an external storage device 5, a detection circuit 6, a display circuit 7, a communication interface 8, a MIDI interface (where 'MIDI' is an abbreviation for the known standard of 'Musical Instrument Digital Interface') 9.

The detection circuit 6 operates as an input interface for inputting operation events of a mouse and a keyboard 11. The display circuit 7 is actualized by a video card or video chip, which performs display control on the display 12. The communication interface 8 provides connections with a local area network (LAN) or the Internet, or it is connected with a communication network 13 via telephone lines, for example. That is, the personal computer can perform communications with server computers (not shown) by means of the communication interface 8. The MIDI interface 9 is connected with a sound source device (or MIDI device) 14, by which the personal computer can perform communications based on the MIDI standard. In a playback mode of user's performance data and style data, the personal computer provides MIDI data that are supplied to the sound source device 14 via the MIDI interface 9. Based on the MIDI data, the sound source device 14 activates the sound system 15 to generate musical tones. The timer 4 generates interrupt signals that are used to perform interrupt processes for playback and recording. In addition, the timer 4 generates various types of clock signals that are used to perform interrupt processes for detecting operation events of the keyboard.

The CPU 1 uses a working area of the RAM 3 to perform normal controls in accordance with the operating system (OS) that is installed on hard disks of a hard disk drive (HDD), which corresponds to the external storage device 5. As the normal controls, the CPU 1 controls the display 12, and it inputs data in response to user's operations of the mouse and keyboard 11. In addition, the CPU 1 controls the position of a mouse pointer (or mouse cursor) on the screen of the display 12, and it detects user's click operations of the mouse. Thus, user's input and setting operations are implemented using the mouse 11 and the display 12 by the so-called graphical user interface (GUI).

As the external storage device 5, it is possible to use a floppy disk drive (FDD), a hard-disk drive (HDD), a magneto-optical disk (MO) drive, a CD-ROM drive, a digital versatile disk (DVD) drive, or else. The external storage device 5 provides the personal computer with performance information edit and playback programs, details of which will be described later. In addition, the external storage device 5 is used to save user's performance data that the user creates according to needs. Further, the external storage device 5 can be used as databases for tune template data and style data, which are basic information for the user to create the user's performance data.

Connecting the communication interface 8 with the communication network 13, the personal computer can download from the server computer, performance information edit and playback programs as well as various types of data such as tune template data and style data. The present embodiment is designed such that the hard disks of the hard-disk drive (HDD) corresponding to the external storage device 5 are used to store the performance information edit and playback programs, tune template data and style data. So, the CPU 1 expands the performance information edit and playback programs stored on the hard disks into the RAM 3, according to which it executes performance information edit and playback processes.

Figure 3:
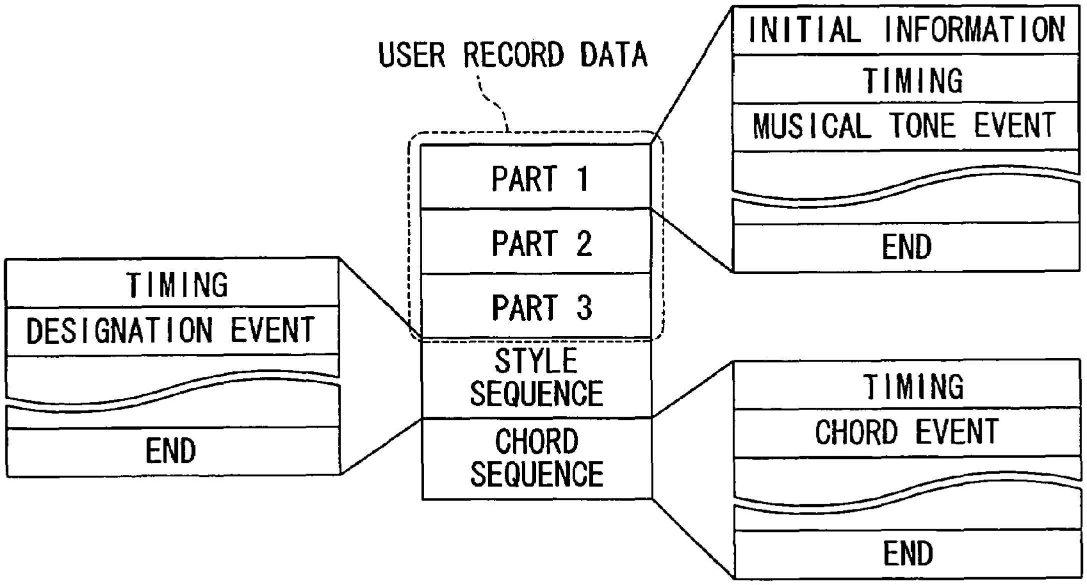
FIG. 3 shows an example of the format for use in representation of user's performance data.

FIG. 3 shows an example of the format for use in representation of the user's performance data (or user record data), which are created by the user for playback of a musical tune. One set of the user's performance data are configured by three parts, namely 'part 1' corresponding to a melody part, 'part 2' corresponding to an accompaniment part and 'part 3' corresponding to a percussion instrument part, as well as a style sequence corresponding to time-series data for accompaniment styles and a chord sequence representing progression of chords in the musical tune.

Each of the three parts 1, 2, 3 contains initial information such as the tone color and tempo, which is followed by pairs of timings and musical tone events. Following the initial information, each part sequentially describes the timings and musical tone events, then, it finally describes end data. The style sequence is used to sequentially read styles in accordance with progression of musical performance, wherein it sequentially describes pairs of timings and designation events, then, it finally describes end data. The chord sequence is used to designate chords in accordance with progression of the musical performance, wherein it sequentially describes pairs of timings and chord events, then, it finally describes end data. Herein, the chord events represent chord types, roots and bass notes, for example. The aforementioned parts 1, 2, 3 and the style sequence and chord sequence are recorded on different tracks respectively, so they are sometimes referred to as tracks in the following description.

Figure 4:
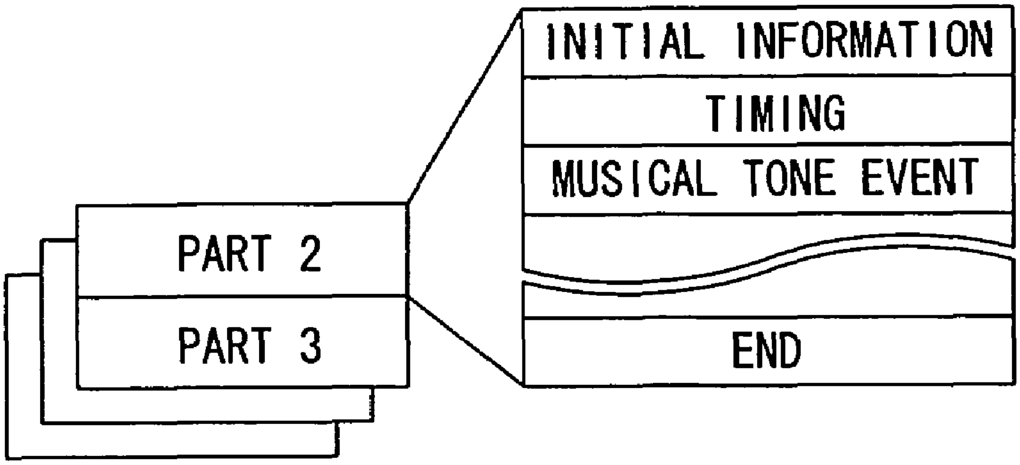
FIG. 4 shows an example of the format for use in representation of style data.

FIG. 4 shows an example of the format for use in representation of the style data, which are prepared in advance for playback of accompaniment. Multiple types of style data are provided for each of music genres such as jazz and rock. They are fixedly stored in the ROM 2 or the external storage device 5, so it is impossible to change contents of the style data. The style data are configured by two parts, namely an accompaniment part (part 2) and a percussion instrument part (part 3). Each of the two parts firstly describes initial information such as the tone color. Following the initial information, it sequentially describes pairs of timings and musical tone events, then, it finally describes end data. The part other than the percussion instrument part corresponds to musical score data of the musical tune which is made based on the prescribed basic chord (e.g., C major). If the style data are read from the ROM 2 or external storage device 5 in the playback of the musical tune, tone pitches of musical tone events are automatically modified to suit to chords of the chord sequence.

The aforementioned user's performance data assign the accompaniment part and percussion instrument part to the parts 2 and 3 respectively, wherein the style sequence is also used to read the style data that allow playback of the accompaniment part and percussion instrument part. Without using the parts 2 and 3, the user's performance data allow generation of accompaniment sounds (and percussion instrument sounds) in addition to the melody of the musical tune by using the melody part (part 1) together with the style sequence and chord sequence. Without using the style sequence, the user's performance data allow generation of accompaniment sounds in addition to the melody of the musical tune by merely using the parts 1, 2 and 3. In this case, it is necessary to create data for the accompaniment part and percussion instrument part as the parts 2 and 3 respectively. Herein, the present embodiment allows copying of a desired part of the style data to the user's performance data. Thus, the present embodiment can assist the user to create or edit a variety of performance data.

Incidentally, the parts 2 and 3 of the user's performance data respectively correspond to the parts 2 and 3 of the style data, wherein each of the parts 2 and 3 is assigned to the same tone-generation channel in a duplicate manner. For this reason, if both of the user's performance data and style data are simultaneously reproduced, a musical tune is played back with merging of the corresponding parts that are assigned to the same tone-generation channel in the duplicate manner.

Figure 1:
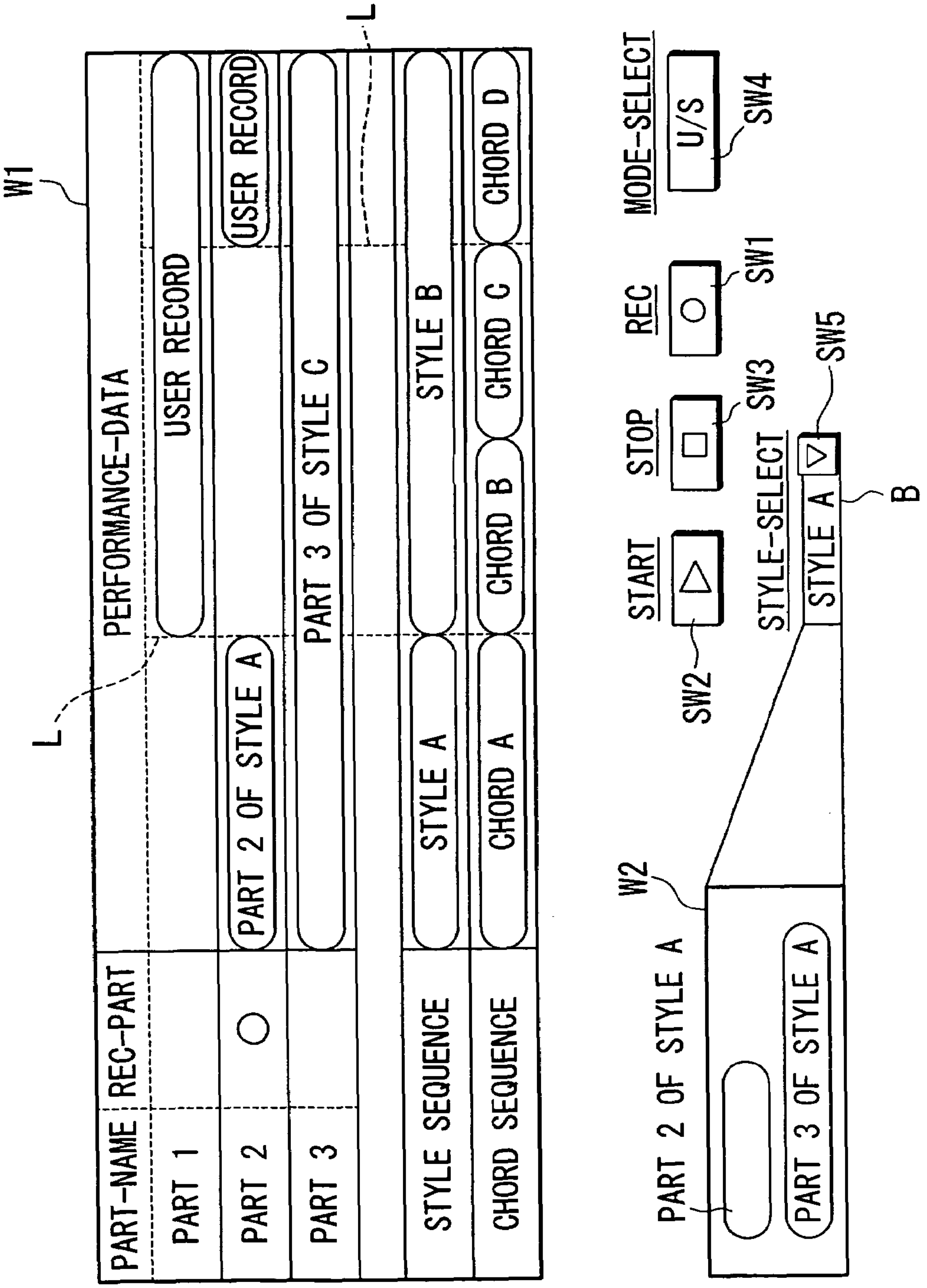
FIG. 1 shows an example of an image that is displayed on the screen in an edit mode or a setup mode of user's performance data in accordance with a preferred embodiment of the invention.

FIG. 1 shows an example of an image (containing windows, icons and buttons) that is displayed on the screen of the display 12 in an edit mode or a setup mode of the user's performance data in accordance with the present embodiment of the invention. Such an image is automatically displayed on the screen when the user selects the user's performance data within an initial image (or menu) that is initially displayed on the screen, wherein the user is able to expand the image of FIG. 1 on the screen during creation of the user's performance data in progress or after completion in writing the user's performance data. On the screen, the display shows a performance data window W1 indicating contents of tracks for the selected user's performance data. There are provided four switches (or buttons) on the screen, namely a record switch (REC) SW1, a start switch (START) SW2, a stop switch (STOP) SW3 and a mode select switch (MODE SELECT) SW4. In addition, an input box B is displayed on the screen to allow the user to select a desired style.

In the performance data window W1, a PART-NAME area contains three sections that describe names of parts 1, 2 and 3 respectively. Correspondingly, an REC-PART area contains three sections in connection with the parts 1, 2 and 3, wherein each section indicates a record mode setting status with respect to each part by using a small circle mark. FIG. 1 shows that the part 2 is set to the record mode while other parts 1 and 3 are not set at the record mode. Every time the user clicks each of the three sections of the REC-PART area with the mouse, it is possible to alternately set or cancel the record mode with respect to each of the parts 1–3.

Figure 2:
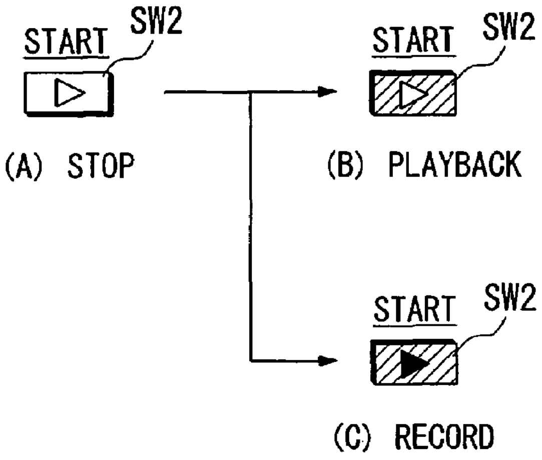
FIG. 2 shows variations of display manners of a start switch that is displayed on the screen of FIG. 1.

The system of the present embodiment proceeds to recording when the user clicks the record switch SW1 and the start switch SW2 with the mouse. After that, input data are written to the part(s) under the record mode. Before the recording, the start switch SW2 is displayed on the screen as shown by (A) of FIG. 2 indicating a stop condition. When the user clicks the start switch SW2 with the mouse, the start switch SW2 is changed in a display manner (e.g., color) as shown by (B) of FIG. 2 indicating a playback condition if none of the parts 1, 2 and 3 of the user's performance data is set to the record mode. If at least one of the parts 1, 2 and 3 of the user's performance data is set to the record mode, the start switch SW2 is further changed in a display manner as shown by (C) of FIG. 2 indicating a record condition. That is, the system of the present embodiment provides a distinction in the display manner between the recording part, which is designated for the recording of the user's performance data, and the non-recording part which is not designated for the recording of the user's performance data. Thus, the user is able to visually recognize whether the user's performance data are presently subjected to recording or not.

A PERFORMANCE-DATA area contains three elongated-rectangular areas in connection with the parts 1–3 respectively, wherein each area shows contents of performance data with respect to each track. Herein, a horizontal direction directing from the left to the right on the screen indicates a lapse of time, along which each area is partitioned into sections using delimiter lines L corresponding to bar lines, for example. Elongated circular bars called "blocks" are displayed on the section(s) of the areas, wherein each of them indicates content of performance data with respect to the corresponding part. By double clicks, it is possible to select each of the blocks displayed on the sections corresponding to measures in the PERFORMANCE-DATA area, so that detailed content of the selected block is to be displayed on the screen. This allows the user to edit the content of the performance data corresponding to the selected block in the PERFORMANC-DATA area on the screen. The performance data window W1 also contains two areas for the style sequence and chord sequence. Herein, the style sequence area is divided into three sections corresponding to measures, on which elongated circular bars (or blocks) are displayed to show names of styles. The chord sequence area is also divided into three sections corresponding to measures, on which elongated circular bars (or blocks) are displayed to show names of chords.

In the track of the part 1 shown in FIG. 1, for example, a first section (or first measure) describes no performance data, while second and third sections (or second and third measures) describe a block of user's performance data (or user record data) that are created by the user. In the track of the part 2, a first section describes a block regarding 'part 2 of style A', which is performance data copied from the style sequence. In addition, a second section describes no performance data, while a third section describes a block of user's performance data (or user record data). In the track of the part 3, all of three sections describe a same block regarding 'part 3 of style C', which is performance data copied from the style sequence. In the track of the style sequence, a first section describes a block of 'style A', while second and third sections describe a same block of 'style B'. In the track of the chord sequence, a first section describes a block of 'chord A', a second section describes blocks of 'chord B' and 'chord C', and a third section describes a block of 'chord D'.

Incidentally, the performance data window W1 merely shows general names regarding performance data, styles and chords such as 'user record', 'style A', 'style B', 'style C', 'chord A', 'chord B', 'chord C' and 'chord D'. Actually, the window W1 shows their concrete names, which are designated by the user or else. Particularly, the names of 'chord A' to 'chord D' do not designate names of roots of chords.

The input box B named 'STYLE-SELECT' is an area of a list menu form that allows the user to select a desired style. Clicking a down button, the input box B shows a list box showing names of styles. Clicking a desired style from among the styles of the list box, the input box B shows the desired style selected by the user. FIG. 1 shows that 'style A' is selected in the input box B. Upon selection of the style in the input box B, a style data window W2 is automatically displayed at a leftside of the input box B on the screen. The style data window W2 has a rectangular area in which constituent parts of the selected style are shown by elongated circular bars (or blocks). FIG. 1 shows that the style data window W2 contains a relatively short part 2 and a relatively long part 3 with respect to 'style A'.

The user is able to paste a desired block (namely, desired part of the selected style) of the style data window W2 onto a desired position within the aforementioned sections of the PERFORMANCE-DATA area of the performance data window W1 by drag and drop operations with the mouse. That is, the user clicks the desired block of the style data window W1, so that the user drags and then drops it to the desired position, namely the desired section within the PERFORMANCE-DATA area of the performance data window W1. FIG. 1 shows that the user copies the block of 'part 2 of style A', which is originally described in the style data area W2, to the first section of the part 2 in the PERFORMANCE-DATA area. In addition, FIG. 1 also shows that the user copies a block of 'part 3 of style C' to first to third sections of the part 3 of the PERFORMANCE-DATA area.

Incidentally, a length of the block of 'part 2 of style A' is shorter than a length of one section in the PERFORMANCE-DATA area. Copying the block to the section one time, the system of the present embodiment automatically provides repetition of the block so that the part of the style A is extended to match with the length of the section. In the track of the part 3 of the PERFORMANCE-DATA area, the user copies a block of 'part 3 of style C' (which is similar to the block of 'part 3 of style A') to each of the three sections respectively, so that the block is extended entirely over the three sections on the screen.

As described above, the present embodiment allows the user to write performance data of a desired part of the style data into the user's performance data in the PERFORMANCE-DATA area on the screen. FIG. 1 shows the user's performance data in which parts of different styles (namely, styles A and C) are simultaneously produced in parallel.

Clicking the stop switch SW3, it is possible to stop playback and recording on the screen.

Figure 5:
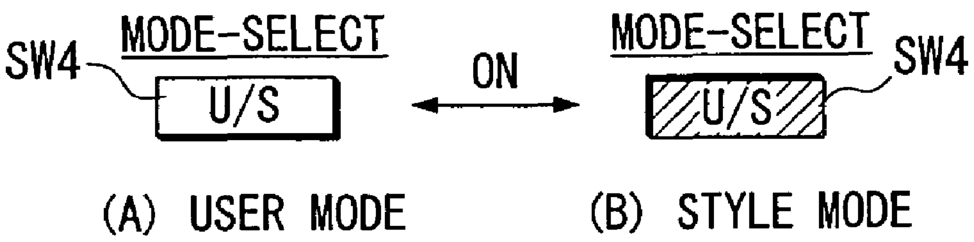
FIG. 5 shows variations of display manners of a mode select switch that is displayed on the screen of FIG. 1.

Clicking the mode select switch SW4, it is possible to change over performance data, which are selectively read for the accompaniment part. Namely, the mode select switch SW4 is used to change over between the style data and user's performance data with regard to selection for the parts 2 and 3. At a user mode, the system of the present embodiment selects parts 2 and 3 of the user's performance data. At a style mode, the system selects parts 2 and 3 of the style data. The mode select switch SW4 is changed in a display manner (e.g., color) in response to the modes respectively. In FIG. 5, (A) shows the mode select switch SW4 in the user mode, while (B) shows the mode select switch SW4 in the style mode.

Next, detailed operations of the performance information edit and playback programs that are executed by the CPU 1 will be described with reference to flowcharts of FIGS. 6 to 8. First, a description will be given with respect to a main process with reference to FIG. 6. In step S1, the CPU 1 performs an initialization process that allows the user to newly create user's performance data or select user's performance data as an edit subject so that the display 12 displays the aforementioned images (see FIG. 1) on the screen with respect to the user's performance data newly created or selected. In addition, the CPU 1 resets various kinds of flags for use in execution of the programs. In step S2, a decision is made as to whether a clock event occurs on the mode select switch SW4 or not. If the CPU 1 does not detect the click event, the flow proceeds to step S4. If the CPU 1 detects the click event on the mode select switch SW4, the flow proceeds to step S3 in which a MODE flag is inverted in logic, namely, logic 1 is changed to logic 0, or logic 0 is changed to logic 1. Herein, the style mode is designated by logic 0 set to the MODE flag, while the user mode is designated by logic 1 set to the MODE flag. In addition, the mode select switch SW4 is changed in the display manner as shown by (A) and (B) of FIG. 5. After completion of the step S3, the flow proceeds to step S4.

In step S4, a decision is made as to whether a click event occurs on the start switch SW1 or not. If the CPU 1 does not detect the click event, the flow proceeds to step S6. If the CPU 1 detects the click event on the start switch SW1, the flow proceeds to step SW5 in which the start switch SW1 is adequately changed in the display manner as shown by (A)–(C) of FIG. 2 based on a REC flag with respect to a part (or parts) of the user's performance data which is set to the record mode. In addition, a RUN flag is set to '1' while a readout start position is designated for the performance data. Herein, the REC flag indicates whether to record input data onto the performance data during playback of a musical tune, namely, the input data are recorded when the REC flag is set to '1', while the input data are not recorded when the REC flag is set to '0'. If the REC flag is set to '0', the system of the present embodiment does not discriminate whether the designated part is in the record condition or not. Therefore, the system certainly displays the start switch SW2 in the playback condition (see (13) of FIG. 2). In addition, the RUN flag indicates whether to start a playback record process (or an interrupt process), details of which will be described later. Namely, the playback record process is started when the RUN flag is set to '1', while it is not started when the RUN flag is set to '0'. After completion of the step S5, the flow proceeds to step S6.

Figure 7:
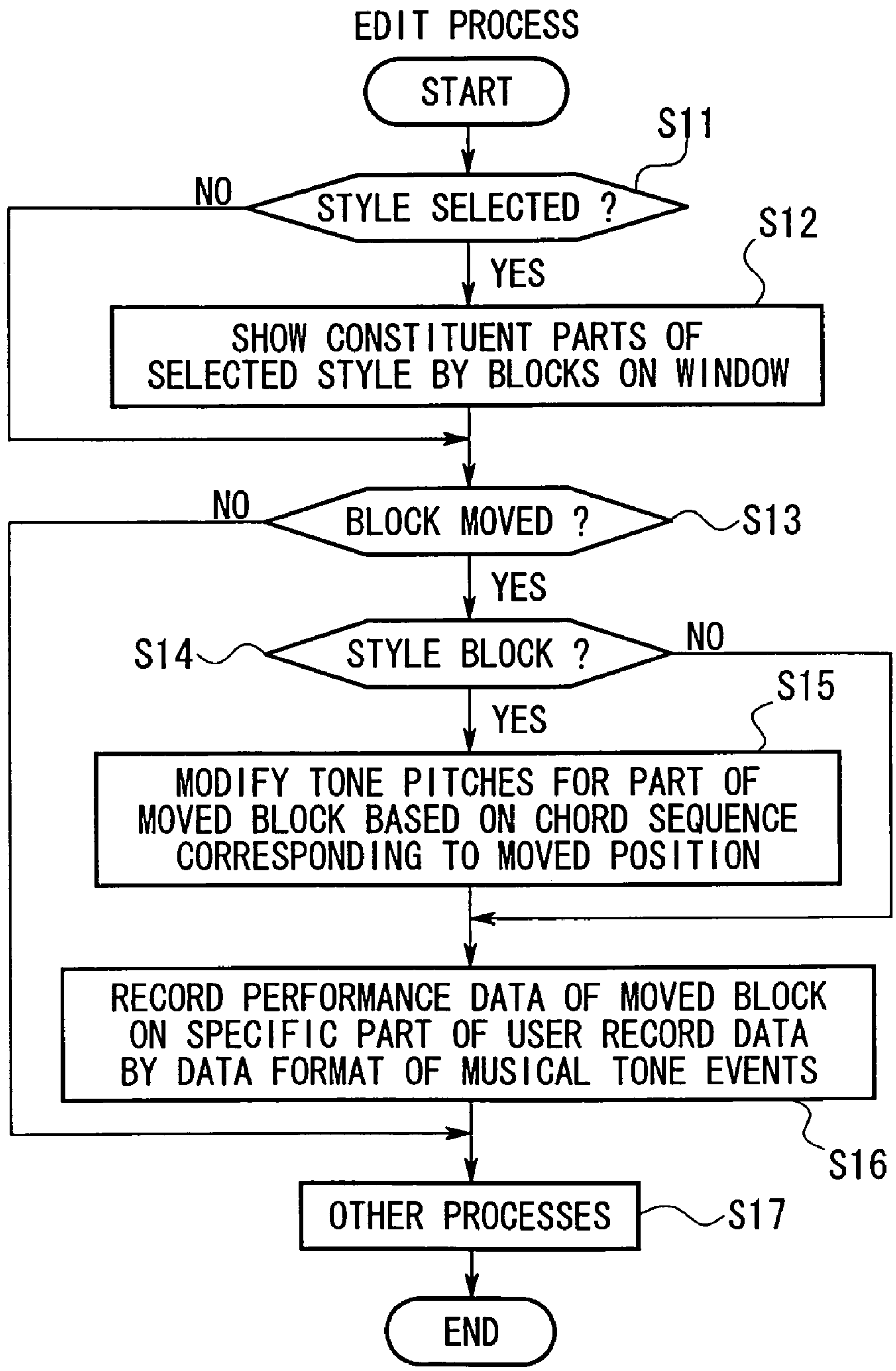
FIG. 7 is a flowchart showing an edit process executed by the CPU.

In step S6, the CPU 1 performs an edit process, details of which are shown in FIG. 7. In step S7, the CPU 1 performs other processes. In step S8, a decision is made as to whether the CPU 1 reaches an end of the main process or not. If "NO", the flow returns to step S2. If "YES", the CPU 1 ends the main process. There are provided three examples for the other processes of step S7, which will be described below.

(1) In response to click of the stop switch SW3, the RUN flag is set to '0'.
(2) In response to click of the record switch SW1, the REC flag is inverted in logic.
(3) In response to click of each area of the REC-PART area, the system displays or erases a small circle mark representing designation of the record mode with respect to each part of the user's performance data in the performance data window W1 on the screen. Herein, clicking each area of the REC-PART area, it is possible to designate or cancel the record mode with respect to each part of the user's performance data.

Due to the aforementioned step S5, it is possible to change the start switch SW2 in the display manner (see FIG. 2) in response to designation or cancel of the record mode.

Next, a description will be given with respect to an edit process with reference to FIG. 7. In step 11, a decision is made as to whether the user selects a desired style by using the STYLE-SELECT area (i.e., input box B) on the screen or not. If "NO", the flow proceeds to step S13. If the user selects the desired style in step S11, the flow proceeds to step S12 in which the system of the present embodiment shows constituent parts of the selected style in the style data window W2 on the screen, wherein the constituent parts are indicated by elongated circular bars (namely, blocks). In step S13, a decision is made as to whether the user moves the block by click and drag operations on the screen or not. If "NO", the flow proceeds to step S17. If the user moves the block on the screen, the flow proceeds to step S14 in which a decision is made as to whether the moved block corresponds to the constituent part of the style data or not. In other words, a decision is made as to whether the user performs drag and drop operations to move the block of the style data from the style data window W2 to the performance data window W1 on the screen or not. If the moved block does not correspond to the block of the style data, the flow proceeds to step S16. If the moved block corresponds to the block of the style data, the flow proceeds to step S15 in which tone pitches are modified with respect to the part (namely, constituent part of the style data) designated by the moved block on the basis of the content (i.e., chord) of the chord sequence being allocated to the moved position (namely, a certain section of the PERFORMANCE-DATA area). As for the first section of the part 2 within the performance data window W1 shown in FIG. 1, for example, tone pitches are modified based on 'chord A' allocated to the first section of the track of the chord sequence.

In step S16, performance data of the moved block (containing tone pitches modified by the foregoing step S15) are recorded on the specific part of the user's performance data (see FIG. 3) by the prescribed data format of musical tone events. In addition, the system modifies the image of the screen (see FIG. 1) to suit to updated user's performance data. As for the first section of the part 2 in the performance data window W1 shown in FIG. 1, for example, performance data of 'part 2 of style A' are modified in tone pitches and are then recorded on the part 2 of the user record data shown in FIG. 3 by the prescribed data format of musical tone events. After completion of the step S16, the flow proceeds to step S17.

Figure 6:
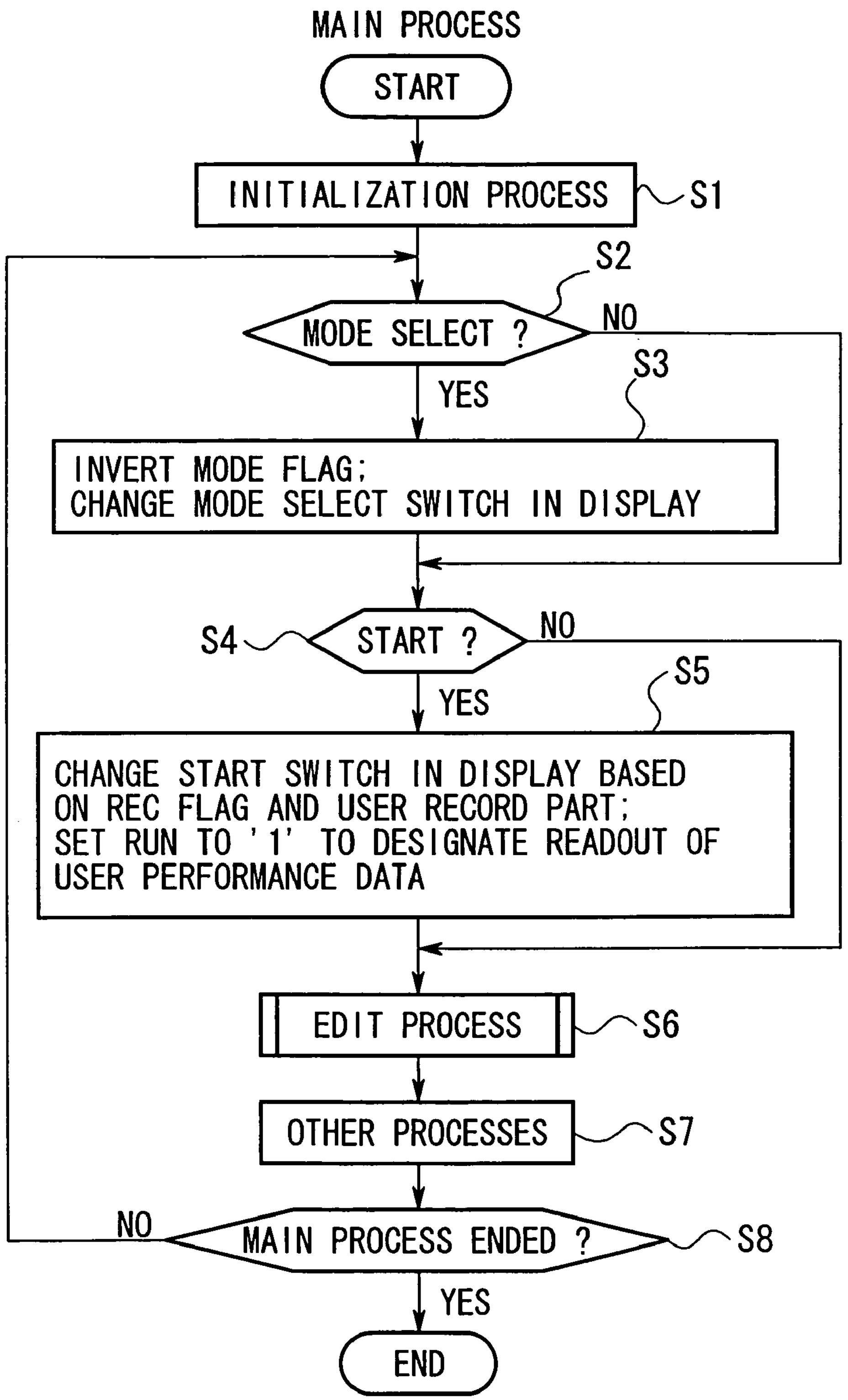
FIG. 6 is a flowchart showing a main process executed by a CPU shown in FIG. 9.

In step S17, the CPU 1 performs other processes, then, it reverts control to the main routine shown in FIG. 6. As the other processes of step S17, the CPU 1 performs the following processes.

(1) An edit process on details of the block.

(2) An expansion process or a reduction process on the block. In the expansion process, the CPU 1 performs repetition of the data of the block to match with an expanded length of the block. In the reduction process, the CPU 1 eliminates an excessive amount of data included in the block to reduce the length of the block.

(3) A process for editing or newly creating a block (i.e., performance data) for use in the user record part, which is shown by the second and third sections of the part 1 or the third section of the part 2 in the performance data window W1 shown in FIG. 1.

By the foregoing steps S14, S15 and S16 shown in FIG. 7, it is possible to copy onto the user record data, a specific part of the style data which are modified in tone pitches based on the content of the chord sequence.

Figure 8:
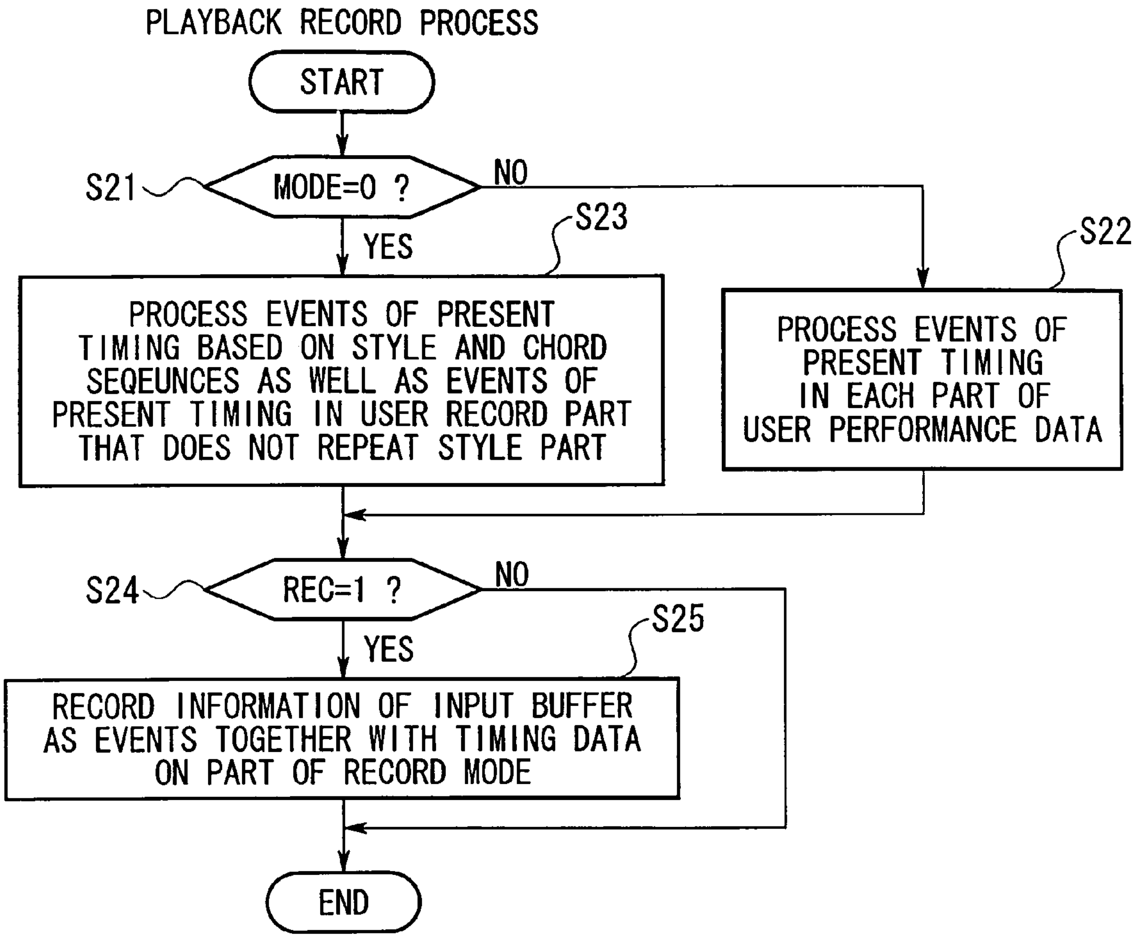
FIG. 8 is a flowchart showing a playback record process executed by the CPU.

FIG. 8 shows an example of the playback record process, which is started as an interrupt process only when the RUN flag is set to '1' in the playback condition. In step S21, a decision is made as to whether the MODE flag is set to '0' or not. If the MODE flag is set to '1' designating a user mode, the flow proceeds to step S22 in which the CPU 1 processes events of the present timing with respect to each part of the user's performance data. Then, the flow proceeds to step S24. If the MODE flag is set to '0' designating a style mode, the flow proceeds to step S23 in which the CPU 1 processes events of the present timing based on the style sequence and chord sequence as well as events of the present timing of the specific part (e.g., part 1) of the user's performance data that does not repeat the foregoing part (e.g., parts 2 and 3) of the style data. After completion of the step S23, the flow proceeds to step S24.

In step S24, a decision is made as to whether the REC flag is set to '1' or not. If the REC flag is set to '0' designating a non-recording mode, the flow reverts control to the original routine. If the REC flag is set to '1' designating a recording mode in progress, the flow proceeds to step S25 in which information of the input buffer is recorded on the specific part, which is under the record condition, as events of performance data together with their timing data. Then, the flow reverts control to the original routine. As the input buffer, it is possible to use a buffer that successively stores information of musical performance that the user plays on the electronic musical instrument (not shown) connected with the MIDI interface 9, for example. Herein, the input buffer records information of user's performance every interrupt timing thereof The temporarily stored content of the input buffer is cleared every time the CPU 1 performs a recording process of the specific part in the foregoing step S25. Thus, it is possible to create the user record part, namely a block of performance data that is arranged in the second and third sections of the track of the part 1 or the third section of the track of the part 2 shown in FIG. 1.

Because of the alternative execution of the steps S22 and S23, the system of the present embodiment does not simultaneously reproduce the part that is repeated between the user's performance data and style data. Therefore, it is possible to play back a musical tune precisely in response to user's instructions or commands.

It is possible to modify the present embodiment within the scope of the invention in a variety of manners, which will be described below.

Detailed contents of the parts of the user's performance data are not necessarily limited to ones as described in the present embodiment. However, it is preferable that prescribed part numbers are allocated to part types (namely, types of musical instruments) in advance as described in the present embodiment.

In addition, a number of parts included in the user's performance data is not necessarily limited to the aforementioned number (i.e., three) of the present embodiment, hence, it is possible to arbitrarily set a desired number of parts included in the user's performance data. Herein, it is required to establish correspondence between the parts included in the user's performance data and parts included in the style data. The present embodiment sets the same part numbers to represent correspondence between the prescribed parts of the user's performance data and the parts of the style data. Alternately, it is possible to set the same part between the user's performance data and style data with respect to the same tone color.

The present embodiment describes such that multiple types of style data are stored with respect to each genre of music. It is possible to store multiple types of style data with respect to each variation (e.g., intro, fill-in, main, ending, etc.) and each genre of music.

The present embodiment describes such that the style data consists of data of multiple parts. It is possible to configure the style data to include an optimal chord sequence in addition to the data of multiple parts. In that case, when a style block designating a specific part contained in the style data is pasted onto a desired section of the user's performance data, it is modified in tone pitch based on the chord sequence of the style data.

The present embodiment can be modified to allow writing of the style data into the user's performance data restrictively with respect to the same part therebetween.

The present embodiment can be modified to allow the user to set the record mode on the style sequence and chord sequence as well.

The present embodiment uses the prescribed data format of musical tone events for describing details of parts of the style data, which are recorded on designated parts of the user's performance data. Instead, it is possible to use a simple format of data that merely designate the specific part of the style data.

The overall system of the present embodiment is configured using a personal computer that runs software programs regarding performance information edit and playback processes. Of course, this invention is applicable to electronic musical instruments simulating various types of musical instruments such as keyboard instruments, stringed instruments, wind instruments, percussion instruments, etc. In addition, this invention can be applied to automatic performance apparatuses such as player pianos. Further, this invention can be applied to various types of music systems, which are actualized by liking together sound source devices, sequencers and effectors by communication tools, MIDI interfaces, networks and the like.

As the format for describing the user's performance data, style data, style sequence and chord sequence, it is possible to use any one of the prescribed formats, examples of which are described below.

(1) Format of '(event)+(relative time)' in which an occurrence time of an event is represented by a time that elapses from a preceding event.

(2) Format of '(event)+(absolute time)' in which an occurrence time of an event is represented by an absolute time in a musical tune or a measure.

(3) Format of '(pitch or rest)+length' in which timing of an event is represented by a tone pitch of a note and its note length or a rest and its length.

(4) Format of 'solid method' in which a performance event is stored in a memory area that corresponds to an occurrence time of the performance event and that is secured with respect to a minimum resolution of automatic performance.

The present embodiment describes such that the performance information edit and playback programs are stored in the hard disks of the external storage device 5. If functions of the personal computer PC shown in FIG. 9 are actualized by the electronic musical instrument, the programs can be stored in the ROM 2, for example. As the external storage device 5, it is possible to use the floppy disk drive, CD-ROM drive, MO disk drive and the like. Using the aforementioned external storage device, the user is able to newly or additionally install the programs with ease. In addition, the user is able to change the programs in the storage to cope with the version-up situation with ease. In addition, the performance information edit and playback programs can be stored on the floppy disk(s), magneto-optical (MO) disks and the like. In that case, the programs are transferred to the RAM 3 or hard disks during execution of the CPU 1.

The present embodiment shown in FIG. 1 uses the communication interface 8 and MIDI interface 9, which can be replaced with other general-purpose interfaces such as the RS-232C interface, USB (universal serial bus) interface and IEEE 1394 interface (where 'IEEE' stands for 'Institute for Electrical and Electronics Engineers').

This invention has a variety of effects and technical features, which are described below.

(1) The performance information edit and playback apparatus of this invention allows the user to copy a desired part of the selected style data to a specific part of the user's performance data. This assists the user to easily create a variety of performance data using preset parts of prescribed styles on the screen of the personal computer and the like.

(2) In the copy function, the desired part of the selected style is automatically modified in tone pitch to suit to chord information of the chord sequence in the performance data window on the screen. This enables desired music performance to be played back without using the chord sequence.

(3) The performance data window provides areas with respect to parts of time-series user's performance data, and the style data window shows constituent parts of the selected style data. Herein, the user is merely required to select a desired part from among the constituent parts of the style data and designate an arbitrary position within the areas of the parts of the user's performance data. Thus, the apparatus automatically copy the desired part of the style data to the designated position within the parts of the user's performance data. This assists the user to freely and easily create the performance data using the constituent parts of the selected style data in the performance data window on the screen.

(4) The apparatus allows the user to alternatively select one of the prescribed part of the user's performance data and the part(s) of the style data. That is, the apparatus enables simultaneous reproduction of the selected part and a part of the user's performance data excluding the prescribed part. Thus, it is possible to play back a musical tune precisely in response to user's instructions or commands.

(5) Even if the prescribed part of the user's performance data and the part(s) of the style data commonly share the same tone-generation channel or same tone color, the apparatus restricts the user to alternatively select one of the aforementioned parts, so it is possible to avoid occurrence of merging of the duplicate parts between the user's performance data and style data in playback of the musical tune.

(6) As the user operates the record switch and start switch, the start switch is automatically changed in a display manner (e.g., color) in response to a condition as to whether the user designates the specific part of the user's performance data for recording or not. This allows the user to visually recognize whether the performance data are presently under recording or not.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A performance information edit and playback apparatus comprising:

a first storage for storing style data, wherein the style data include a prescribed accompaniment part representing a predetermined length of accompaniment;

a second storage for storing user's performance data produced by a user, wherein the user's performance data include an accompaniment part and another performing part subjected to simultaneous playback with the accompaniment part;

a mode selector switch for alternatively selecting, in accordance with a user's operation, one of a style data playback mode and user's performance data playback mode; and a playback device operable to simultaneously play back the prescribed accompaniment part included in the style data and another performing part included in the user's performance data when the mode selector selects the style data playback mode upon starting playback, said playback device operable to simultaneously play back the accompaniment part included in the user's performance data and another performing part included in the user's performance data when the mode selector selects the user's performance data playback mode upon starting playback.

2. A performance information edit and playback apparatus according to claim 1, wherein both of the accompaniment parts included in the user's performance data and the prescribed accompaniment parts included in the style data commonly share a same tone-generation channel or a same tone color.

3. A performance information edit and playback method comprising the steps of:

storing style data, wherein the style data include a prescribed accompaniment part representing a predetermined length of accompaniment;

storing user's performance data produced by a user including an accompaniment part and another performing part, subjected to simultaneous playback with the accompaniment part;

alternatively selecting in accordance with a user's operation of a mode switch one of a style data playback mode and user's performance data playback mode;

simultaneously playing back the prescribed accompaniment part included in the style data and another performing part included in the user's performance data when in the style data playback mode upon starting playback; and simultaneously playing back the accompaniment part included in the user's performance data and another performing part included in the user's performance data when in the user's performance data playback mode upon starting playback.

4. A machine-readable medium storing performance data edit and playback programs that cause a computer to perform a method comprising the steps of:

storing style data, wherein the style data include a prescribed accompaniment part representing a predetermined length of accompaniment;

storing user's performance data produced by a user including an accompaniment part and another performing part subjected to simultaneous playback with the accompaniment part;

alternatively selecting in accordance with a user's operation of a mode switch one of a style data playback mode and user's performance data playback mode;

simultaneously playing back the prescribed accompaniment part included in the style data and another performing part included in the user's performance data when in the style data playback mode upon starting playback; and simultaneously playing back the accompaniment part included in the user's performance data and another performing part included in the user's performance data when in the user's performance data playback mode upon starting playback.

* * * * *